Patented Aug. 2, 1938

2,125,624

UNITED STATES PATENT OFFICE 2,125,624

METHOD OF RECOVERING GLAUBER'S SALT FROM NATURAL BRINE

Sidney H. Davis, Henry W. Doennecke, and Emory W. Douglass, Tulsa, Okla., assignors to Ozark Chemical Company, Tulsa, Okla., a corporation of Delaware No Drawing. Application February 26, 1937, Serial No. 127,910

6 Claims. (Cl. 23—41)

Our invention relates to the treatment of natural brines containing sodium sulfate in solution and is particularly directed to an improved method of obtaining therefrom the maximum commercially practicable yield of Glauber's salt, ($Na_2SO_4.10H_2O$).

There are in certain parts of the United States and elsewhere subterranean deposits of sodium sulfate brines of variable concentration which, due to dissolved salts and other constituents, have a specific gravity running sometimes as high as about 1.30, the brines which are "rich" in sodium sulfate as compared with other constituents containing about 7% to about 14% of this salt in solution.

Various methods of recovering the sodium sulfate in crystallized form as Glauber's salt from brines of this character have been suggested, usually including, among other steps, precipitation by cooling sometimes preceded by concentration of the brine by evaporation, but these methods are not only unduly expensive but effect the recovery of only something more than half the sodium sulfate content of the brine.

A principal object of the invention, therefore, is to provide a novel method of treating such brines whereby the maximum proportion of their sodium sulfate content can be recovered at a relatively low cost.

A further object comprehends the introduction of sodium chloride into brines of this character to induce the precipitation of a larger percentage of their sodium sulfate content when subsequently cooled to a given temperature than can be attained by like cooling of the brines in their natural state.

The invention furthermore comprehends a novel, efficient and economic method of attaining the desired sodium chloride addition to natural brines in large scale commercial operations directed to the recovery of Glauber's salt.

Other objects, purposes and advantages of the invention will be understood or will more fully appear from the following illustrative description of a preferred manner of performing it.

In certain parts of the country, particularly certain sections of Texas, the brine occurring naturally in subterranean pools or other bodies in fairly large quantity and accessible through wells 100 feet more or less in depth, may contain up to approximately 13.1% sodium sulfate with about 9% in the aggregate of magnesium, sodium and potassium chlorides and has a specific gravity of about 1.20. As drawn from the earth, such brine is usually at a temperature of about 70° F. and when chilled or cooled in a double pipe cooler or otherwise to about 30° F., a portion of the sodium sulfate content can be precipitated in a relatively pure state as Glauber's salt, $Na_2SO_4.10H_2O$. However, after such chilling and removal of the precipitate, 35% or more of the original sodium sulfate content remains in solution in the end liquor and while a relatively small portion of it may be precipitated by further chilling or by concentration through evaporation and subsequent chilling, the quantity of the salt which can be recovered by such treatment of the liquor is insufficient to justify the expense involved, and the liquor is therefore usually discarded after the first chilling and salt recovery.

We have found, however, that if the brine in its natural state is so treated with sodium chloride as to cause it to approach saturation with this salt, a much greater proportion of the sodium sulfate content of the brine can be recovered on the subsequent chilling.

For example, in laboratory tests, a natural brine containing about 6.95% sodium sulfate with a specific gravity of 1.10 had dissolved in it prior to chilling about 15% of sodium chloride without producing any precipitate, but when thereafter chilled to 30° F. precipitated substantially pure Glauber's salt with the recovery of approximately 80% of the initial sodium sulfate content as compared with but about 32% obtainable by similar chilling of the same brine without previous addition of sodium chloride. Furthermore, whereas on further cooling the brine in its natural state froze at 24° F. with recovery of only about 16% more of the sodium sulfate content prior to freezing, the brine to which 15% sodium chloride had been added when cooled to just above —2° F., its freezing point, gave a recovery of a total of about 98% of its initial sodium sulfate content. But in large scale commercial operations which must necessarily be carried out in proximity to the brine wells, the value of the additional amount of Glauber's salt which can be recovered by adding common salt to the natural brine might not compensate for the cost of the added material if allowed to go to waste in the end liquor nor for the cost of recovering it therefrom for re-use with fresh brine.

However, through the medium of our invention we can obtain the benefit of the sodium chloride addition at a non-prohibitive cost by introducing the brine into those subterranean deposits of solid sodium chloride which frequently occur in regions economically accessible to sources of the brine, usually beneath an impermeable overlying stratum, and at a depth of 1,000 to 2,000 feet below the surface, where the natural temperature may sometimes be as high as 85° F., access to the deposit being obtained through a suitable well.

In accordance with our method such a well may be provided with a casing pipe with an inner pipe extending axially through it and for some distance beyond its lower end into the deposit, said pipes being so arranged and connected that the brine may be pumped into the deposit through the outer pipe and withdrawn therefrom through the inner pipe or vice versa. For best results it is desirable that the flow of brine through the pipes be controlled as to velocity and volume in such manner as to afford opportunity for it to dissolve a material quantity of sodium chloride and if the temperature of the deposit is above that of the brine, the temperature of the latter may be correspondingly raised while it is in the well and its specific gravity under these conditions may also increase to about 1.28 in a brine originally "rich" in sodium sulfate.

The brine as it is drawn from the well, still with all its original sodium sulfate and other constituents in solution in addition to the sodium chloride it has dissolved while in the well, may then be transferred directly to a suitable cooler and chilled to a temperature sufficiently low to precipitate Glauber's salt, preferably in accordance with the method disclosed in U. S. Letters Patent 2,007,956 issued to Sidney H. Davis et al. July 16, 1935, to thereby effect the continuous recovery of crystalline Glauber's salt in a substantially pure state, the precipitation beginning at a point usually several degrees higher than in a similar raw brine when chilled in its natural state. Precipitation initially proceeds at a fairly rapid rate proportional to the rate of chilling to about between 30° F. and 20° F. when, most of the Glauber's salt having been thrown down, this rate declines with increasing rapidity as the freezing point of the solution is approached. Thus this point is rarely reached until after precipitation of at least 90% of the original sodium sulfate whereas the brine in its natural state may freeze before 50% of the sulfate has been precipitated.

The chilled brine after it has reached the desired temperature is then filtered, the end liquor retaining in solution substantially all the original constituents of the brine including the additional sodium chloride supplied to it and usually not over one or two per cent of sodium sulfate.

Since the sodium chloride, as indicated, reduces the freezing point of the brine in which it is dissolved, the latter may of course be cooled to a considerably lower temperature than would otherwise be possible without solidification, but the desirability of cooling it to a temperature very close to the freezing point, in which temperature range the recovery is relatively small, will generally be governed by the relation between the added expense thereby entailed and the value of the additional amount of Glauber's salt recovered.

The Glauber's salt derived by the practice of the method just described, especially if the brine has been substantially saturated with sodium chloride, may sometimes contain a small percentage of the latter salt but if this is considered inimical in the final product, its precipitation with the Glauber's salt can readily be prevented by the addition of about 5% by weight of water to the salt-treated brine prior to or concurrently with its introduction into the cooler, or its passage through the well may be so regulated as to prevent the solution in it of so large a quantity of sodium chloride.

It will be apparent that the preferred practice of our method affords a convenient and relatively inexpensive manner of recovering in a commercial way maximum quantities of Glauber's salt from natural brines, enabling, as it does, the desired addition of sodium chloride to be readily effected with consequent release of the maximum quantity of sodium sulfate when the brine is subsequently cooled to a given temperature; moreover the contemporaneous reduction of the freezing point of the brine facilitates cooling it to a lower temperature than would otherwise be possible without freezing with corresponding increase in the amount of Glauber's salt economically and practically recoverable therefrom. The method is therefore of marked utility and of especial advantage in those localities where the brine is found in proximity to salt deposits of the character described or sufficiently close thereto to enable it to be economically pumped to the deposits from the brine wells or other sources of brine supply.

We are aware it has been proposed to directly precipitate anhydrous sodium sulfate ($Na_2SO_4$) from relatively hot saturated solutions thereof by the addition of magnesium sulfate, sodium chloride or mixtures thereof, but our method is concerned with the recovery of sodium sulfate from unsaturated brines, there is no direct precipitation immediately following the addition of the sodium chloride, precipitation being attained only after subsequent cooling to relatively low temperatures, and the final product is the hydrous and not in the anhydrous form.

It is to be understood that while we have herein described a preferred manner of practising our invention we do not intend to specifically restrict ourselves thereto as various changes and modifications may be made therein if desired without departing from the spirit and scope of the invention as defined in the appended claims.

Having thus described our invention, we claim and desire to protect by Letters Patent of the United States:

1. The method of recovering Glauber's salt from natural brine containing sodium sulfate which comprises the steps of introducing the brine into a subterranean deposit of sodium chloride to thereby effect the solution of said chloride in the brine in quantity insufficient to precipitate Glauber's salt therefrom, then withdrawing the brine from the deposit and finally chilling it to precipitate Glauber's salt.

2. The method of recovering Glauber's salt from natural brine containing sodium sulfate which comprises the steps of introducing the brine into a subterranean deposit of sodium chloride at an elevated temperature to thereby heat the brine and dissolve therein a quantity of the chloride insufficient to precipitate Glauber's salt from the brine, withdrawing the chloride containing brine from the deposit and finally chilling it to precipitate Glauber's salt.

3. The method of recovering Glauber's salt from natural unsaturated brine containing sodium sulfate which comprises the steps of introducing the brine into a subterranean deposit of sodium chloride, maintaining the brine in contact therewith a sufficient length of time to dissolve therein some of the chloride while retaining all of the Glauber's salt in solution in the brine, then withdrawing the brine and chilling it to precipitate Glauber's salt.

4. The method of recovering Glauber's salt from unsaturated natural brine containing sodium sulfate which comprises the steps of introducing the brine into a subterranean deposit of sodium chloride, maintaining the brine in contact therewith a sufficient length of time to partially saturate the brine with the chloride while retaining all the Glauber's salt in solution, then withdrawing the chloride containing brine and chilling it to a temperature below about 30° F. to precipitate Glauber's salt substantially free from sodium chloride.

5. The method of increasing the recovery of Glauber's salt attainable from a natural sodium sulfate containing brine by precipitation induced by cooling the brine to a given temperature between 60° F. and its freezing point, which comprises the steps of maintaining the brine in contact with a subterranean deposit of sodium chloride to thereby dissolve some of said chloride in the brine then withdrawing the brine from the deposit and cooling it to said given temperature to precipitate substantially chloride-free Glauber's salt while retaining the dissolved chloride in solution.

6. A method of effecting a commercially useful recovery of crystalline Glauber's salt from natural brine containing sodium sulfate and capable of precipitating a given quantity of said salt when cooled to a given temperature, comprising the steps of maintaining the brine in contact with a natural deposit of sodium chloride to dissolve a quantity of the chloride in the brine, then removing the chloride-containing brine from the deposit and cooling it to said temperature to thereby precipitate therefrom a greater quantity of Glauber's salt than said given quantity while retaining the chloride in solution, and then separating the precipitated Glauber's salt from the end liquor.

SIDNEY H. DAVIS.
HENRY W. DOENNECKE.
EMORY W. DOUGLASS.